P. H. CUSTIS.
FRICTION DEVICE.
APPLICATION FILED SEPT. 8, 1914.

1,127,600.

Patented Feb. 9, 1915.

Witnesses:

Inventor
Parke H. Custis
by Jas. H. Churchill atty

UNITED STATES PATENT OFFICE.

PARKE H. CUSTIS, OF BROOKLINE, MASSACHUSETTS, ASSIGNOR TO THE CORK INSERT COMPANY, OF BOSTON, MASSACHUSETTS, A CORPORATION OF MAINE.

FRICTION DEVICE.

1,127,600.      Specification of Letters Patent.      Patented Feb. 9, 1915.

Application filed September 8, 1914. Serial No. 860,571.

*To all whom it may concern:*

Be it known that I, PARKE H. CUSTIS, a citizen of the United States, residing in Brookline, in the county of Norfolk and State of Massachusetts, have invented an Improvement in Friction Devices, of which the following description, in connection with the accompanying drawings, is a specification, like characters on the drawings representing like parts.

This invention has for its object to increase the gripping efficiency of substantially thin objects or bodies, such, for instance, as the rim of steel or other metal pulleys, bands, disks, rings, brake-shoes and the like, by providing such bodies with cork or other non-metallic friction devices.

The present invention is herein shown as embodied in a steel pulley having a thin rim, which, in accordance with this invention, is provided with non-metallic inserts, which form part of the outer surface of the pulley and increase the friction between the pulley and the belt with which it is used.

The invention has for its object to provide a construction in which a maximum gripping area or surface is obtained and the presence of sharp edges on the surface of the pulley are avoided, thereby preventing the belt being cut or otherwise injured by such edges. To this end, the rim of the pulley is provided with a series of holes, which extend through the rim and each hole is preferably made of two diameters, so as to form between the outer and inner surfaces of the pulley an annular shoulder to support an outwardly extended flange on a metal cup, which is inserted into said hole and projects beyond the rear surface of the rim.

The cup referred to is designed to receive an insert of non-metallic material, preferably cork in its natural state, which is forced into the cup and which projects beyond the open mouth of the cup and fills the portion of the hole in the rim which is of larger diameter, thereby covering the edges of the hole and also the flange of the cup.

The particular features of the invention will be pointed out in the claims at the end of this specification.

Figure 1:
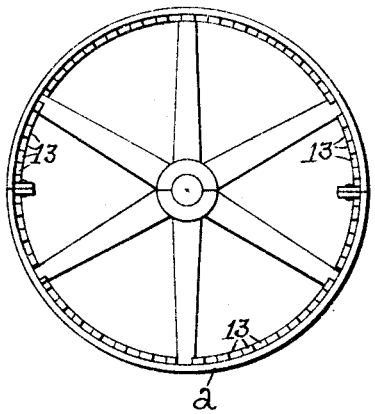
Figure 2:
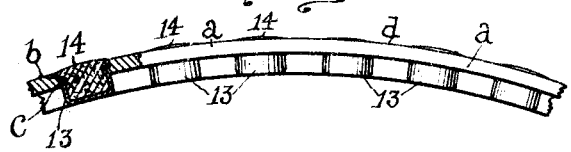
Figure 3:
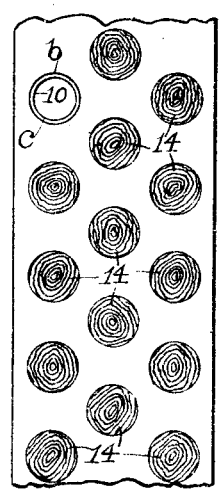

Figure 1 is a side elevation of a pulley embodying this invention. Fig. 2, a side elevation on an enlarged scale of a portion of the rim shown in Fig. 1, with a part in section. Fig. 3, a plan of a portion of the rim shown in Fig. 1, and Figs. 4 and 5, details in section on an enlarged scale.

The device herein shown as embodying this invention is a steel pulley of known construction and having a thin rim $a$. The rim $a$ is provided with a series of holes or openings extended through it, and distributed over the surface thereof as desired, said openings being made as herein shown of two portions $b$, $c$, of different diameters, the portion $b$ being of larger diameter and extended from the outer surface $d$ of the rim and forming with the portion $c$ of smaller diameter an annular shoulder 10, which is located below the outer surface of the rim and forms a support for an annular flange 12 on a metal cup 13, which is preferably formed of sheet metal and is made of substantially the diameter of the lower portion $c$ of the hole in the rim $a$.

The cup 13 is made deep enough to contain an insert 14 of non-metallic material, preferably cork in its natural state, which is compressed and forced by a suitable tool (not shown) into the cup through the opening of larger diameter. The cork insert is made long enough to have its inner end engage the bottom of the cup and its outer end projects beyond the cup and into the portion $b$ of larger diameter, wherein the projecting end of the cork expands and fills the portion $b$ of larger diameter, so that it engages the walls of the portion of larger diameter and covers the edge of the opening and renders the latter harmless for cutting or otherwise injuring the belt (not shown), which coöperates with the pulley.

Figure 4:
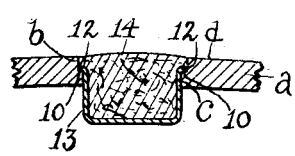

The outer portion of the cork insert is of larger diameter than the cup and overlaps the flange 12 of the latter, thereby assisting to attach the cup 13 to the rim of the pulley. So also, the belt is protected from being injured by the flange on the cup. The outer end of the cork insert preferably extends at its central portion beyond the outer surface of the rim, as shown in Figs. 2, 4 and 5.

Figure 5:

The cup 13 may be mechanically locked to the rim by expanding the inner end of the cup so as to increase the diameter of the projecting portion of the cup and cause it to engage the inner surface of the rim, as represented in Figs. 2 and 5, which expanded portion coöperates with the flange 12 to lock the cup to the rim.

It will be observed that the portion of the cork insert, which engages the belt, is of larger diameter than that contained within the cup, which results in an increased frictional gripping area in the surface of the rim, which increases the frictional efficiency of the pulley.

I have herein shown the invention as embodied in a pulley, but it is not desired to limit the invention in this respect, as it is equally applicable to other thin metal objects, such as brake-shoes, bands, rings, disks, straps and the like, which are used to provide a frictional gripping surface.

Claims.

1. In combination, a substantially thin object provided with an opening extended through it, and having portions of different diameters to form an annular shoulder within the opening, a cup extended through the portion of smaller diameter and having an outwardly extended flange to engage said shoulder, and an insert of cork in its natural state having a portion located in said cup and having a portion projecting out of the cup and filling the portion of the opening of larger diameter, substantially as described.

2. In combination, a substantially thin object provided with an opening extended through it and having portions of different diameters, a cup inserted into the portion of smaller diameter, and an insert of cork in its natural state having a portion located in said cup and having a portion projecting out of the cup and filling the portion of the opening of larger diameter.

3. In combination, a substantially thin object provided with an opening extended through it and having portions of different diameters, a cup inserted into the portion of smaller diameter, and an insert of non-metallic material having a portion within said cup and another portion projecting out of the cup and into the portion of the opening of larger diameter.

4. In combination, a substantially thin object provided with an opening, a cup extended through said opening and having its outer end within said opening and below the outer surface of said object, and an insert of non-metallic material having a portion within said cup and another portion of larger diameter located within the opening in said object and overlapping the end of the cup within said opening.

5. In combination, a substantially thin object provided with an opening extended through it and having portions of different diameters to form an annular shoulder within the opening, a cup extended through the portion of smaller diameter and having the portion which projects beyond the object expanded to engage the surface of said object and having the portion within the opening provided with an outwardly extended flange to engage said shoulder, and an insert of non-metallic material having a portion within said cup and another portion projecting out of the cup into the opening of larger diameter.

In testimony whereof, I have signed my name to this specification in the presence of two subscribing witnesses.

PARKE H. CUSTIS.

Witnesses:
JAS. H. CHURCHILL,
J. MURPHY.